United States Patent [19]

Morgan

[11] 4,318,686  
[45] Mar. 9, 1982

[54] INJECTION MOLDING APPARATUS FOR MOLDING PARTS OF THERMOSETTING PLASTIC MATERIAL

[75] Inventor: Dennis W. Morgan, St. Clair Beach, Canada

[73] Assignee: International Tools (1973) Limited, Windsor, Canada

[21] Appl. No.: 109,362

[22] Filed: Jan. 3, 1980

[51] Int. Cl.³ ................................................ B29F 1/08
[52] U.S. Cl. .................................. 425/543; 425/548; 425/549; 425/552; 425/573
[58] Field of Search ............... 425/543, 548, 549, 552, 425/573

[56] References Cited

U.S. PATENT DOCUMENTS

| | | | |
|---|---|---|---|
| 2,390,266 | 12/1945 | Novotny | 425/543 X |
| 3,591,897 | 7/1971 | Perras | 425/543 X |
| 4,033,485 | 7/1977 | Kohler | 425/548 X |
| 4,212,625 | 7/1980 | Shutt | 425/548 X |

*Primary Examiner*—Thomas P. Pavelko
*Attorney, Agent, or Firm*—Reising, Ethington, Barnard, Perry & Brooks

[57] ABSTRACT

An improved injection molding apparatus for molding parts of thermosetting plastic material. First and second mold portions which together form a mold cavity at their molding surfaces are heated to allow thermosetting plastic material to set within the mold cavity when under pressure. A fluid distribution member comprises a manifold having an inlet port, two or more spaced outlet ports and a passage interconnecting the inlet port with the outlet ports guides the flow of plastic material therein. The manifold is cooled and includes a first manifold section disposed within a channel formed at the upper surface of a second manifold section such that the interconnecting passage is formed by a first wall portion of the first manifold section and a second wall portion of a second manifold section within the channel. The first and second manifold sections are separable to permit access to the passage to permit cleaning thereof. Two nozzle units each including a nozzle are secured within bores extending through the first mold portion by the second manifold section to conduct the flow of viscous plastic material from the outlet ports to the mold cavity. The first manifold section is secured to an upper support member of a support structure to move therewith and the second manifold section is secured to the first manifold portion so that the interior of the interconnecting passage and the second guide section are accessible when the upper support member is moved relative to the first mold portion.

13 Claims, 6 Drawing Figures

INJECTION MOLDING APPARATUS FOR MOLDING PARTS OF THERMOSETTING PLASTIC MATERIAL

TECHNICAL FIELD

This invention relates to injection molding apparatus and in particular to injection molding apparatus for molding parts of thermosetting plastic material.

BACKGROUND ART

Thermosetting plastic material is a material that is in a viscous or plastic state when it is cooled and irreversibly solidifies or sets when heat and pressure are applied to it. This property is caused by the cross-linking reactions of the molecular constituents of the material which may include "curing" agents such as organic peroxides. Examples of such plastic material are glass-filled polyester or glass-filled epoxy. Once the plastic material hardens, the material cannot return to the plastic state. This is different from a thermoplastic material which sets at room temperature but which can return to the liquid or plastic state when heated.

A conventional way of making parts of thermosetting plastic having irregular shapes is from sheet molding compound (S.M.C.). Initially, a plastic sheet is formed which contains glass fibers. The sheet is then placed in the cavity portion of a two-part mold, and heat and pressure are applied to compress the sheet to form it into the shape of the mold cavity. The heat and pressure applied to the sheet hardens the sheet into the shape of the mold cavity defined by the molding surfaces of the mold parts. The mold parts are thereafter separated to remove the hardened plastic part from the mold.

Another way of making such plastic parts is to injection mold the thermosetting plastic material from a bulk molding compound (B.M.C.). The powdery molding compound is first mixed with a binder and transformed into a highly viscous mass. The highly viscous mass flows under pressure through a manifold, through one or more nozzles and into the mold cavity under pressure. The mass changes from its highly viscous state to a liquid state (i.e. its kick-over state) and pressure is applied thereto. In the liquid state the mass conforms to the size and shape of the cavity and crosslinking occurs as additional heat and pressure are applied until the mass becomes solid.

The number of nozzles is determined by the size and shape of the particular molded plastic part (i.e. the size and shape of the mold cavity). The manifold and the nozzles must be constantly cooled such as by cooling circulating water so that the thermosetting plastic material does not set within the manifold or within the nozzles.

Oftentimes, the cooling circulating water is inadvertently turned off when the thermosetting plastic material is in the manifold and/or the nozzles. When this happens, the temperature in the nozzles and the manifold rises due to the elevated temperature of the heated mold parts, thereby causing the plastic to set in the manifold and the nozzles. When this occurs, the only way that the hard thermosetting plastic material can be removed is by mechanically grinding the plastic material into powder by a special tool. This is a time consuming operation because frequently the manifold and nozzles are located in a hard to reach location and the inner passage or passages of the manifold are relatively inaccessible. It is also a costly operation since while the manifold and the nozzles are being cleaned the molding machine lies idle.

DISCLOSURE OF THE INVENTION

An object of the present invention is to provide an injection molding apparatus for molding parts of thermosetting plastic material wherein a passage in a manifold of the apparatus is accessible for cleaning when the plastic material sets within the passage.

Another object of the invention is to provide an injection molding apparatus for molding parts of thermosetting plastic material wherein the manifold of the apparatus is made into sections each of which forms a part of the passage interconnecting an inlet port and at least one outlet port for conducting the fluid plastic material.

A further object of the invention is to provide an injection molding apparatus for molding parts of thermosetting plastic material wherein the manifold of the apparatus is made into sections, one section of the manifold being removable from the other section of the manifold to expose a conducting passage therein when a first mold portion of the apparatus is detached from the support structure of the apparatus.

Yet another object of the invention is to provide an injection molding apparatus for molding parts of thermosetting plastic material wherein the manifold of the apparatus is made into sections, one section being removable from the other section of the manifold to expose a conducting passage therein to permit the cleaning of a nozzle unit in the first mold portion.

In carrying out the above objects and other objects of the invention, a preferred embodiment of the invention includes a first mold portion having a molding surface to form one-half of a mold cavity, a second mold portion having a second molding surface to form a second complementary half of the mold cavity, and the first and second mold portions adapted to be heated to allow the plastic material to set in the mold cavity. The apparatus also includes a fluid distribution member having an inlet port having a restricted opening formed at one surface to receive the plastic material in a fluid state, at least one outlet formed in another surface thereof and communicating with the mold cavity to release the plastic material in a viscous state and a passage interconnecting the inlet port with the outlet port to conduct the flow of plastic material therein. The distribution member is adapted to be cooled to prevent the viscous plastic material from setting therein. The distribution member includes a first distribution section extending along the length of the passage defining a first wall portion of the passage and a separable second distribution section also extending along the length of the passage and forming the complement of the first wall portion to define the passage. The second distribution section is separable from the first distribution section to permit access to the passage to permit cleaning thereof. Securing means releasably secure the first and second distribution sections together.

The objects, features and advantages of the present invention are readily apparent from the following detailed description of the best mode taken in connection with the accompanying drawings.

BEST MODE FOR CARRYING OUT THE INVENTION

Figure 1:
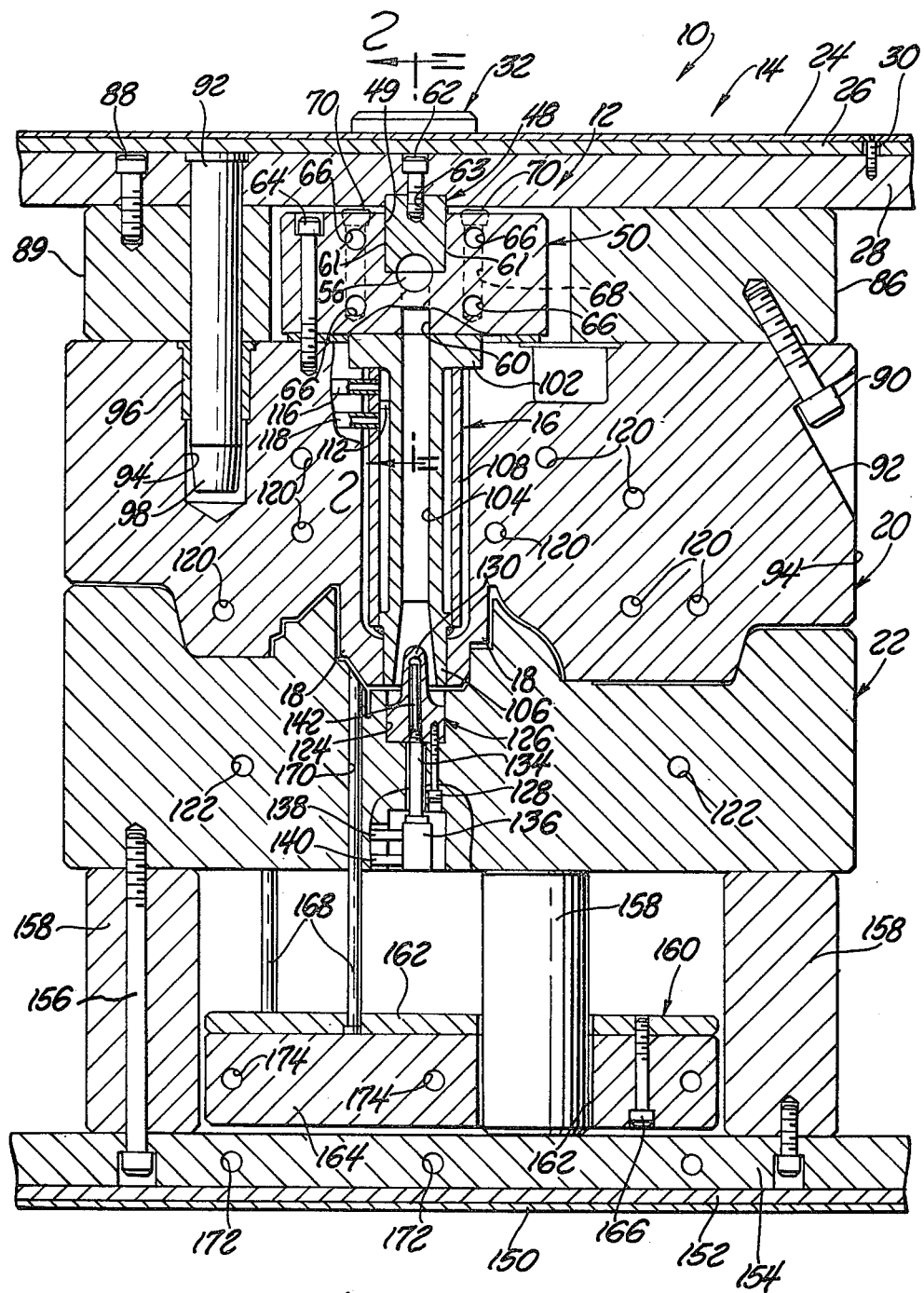
FIG. 1 is a sectional view of injection molding apparatus constructed according to this invention.

With reference to the drawings, an injection molding apparatus for molding sheet parts of thermosetting plastic material is collectively designated by reference numeral 10 in FIG. 1. The molding apparatus includes a fluid distribution member or a molding manifold indicated at 12 supported by a stationary support structure indicated at 14 and in fluid communication with two spaced nozzle units indicated at 16 (only one of which is completely shown) for conveying viscous thermosetting plastic into a mold cavity 18 formed by first and second mold portions 20 and 22, respectively.

The molding manifold 12 is separable and easily accessible when the first mold portion 20 is moved relative to the support structure 14 to allow the manifold 12 and the nozzle units 16 to be cleaned.

Figure 2:
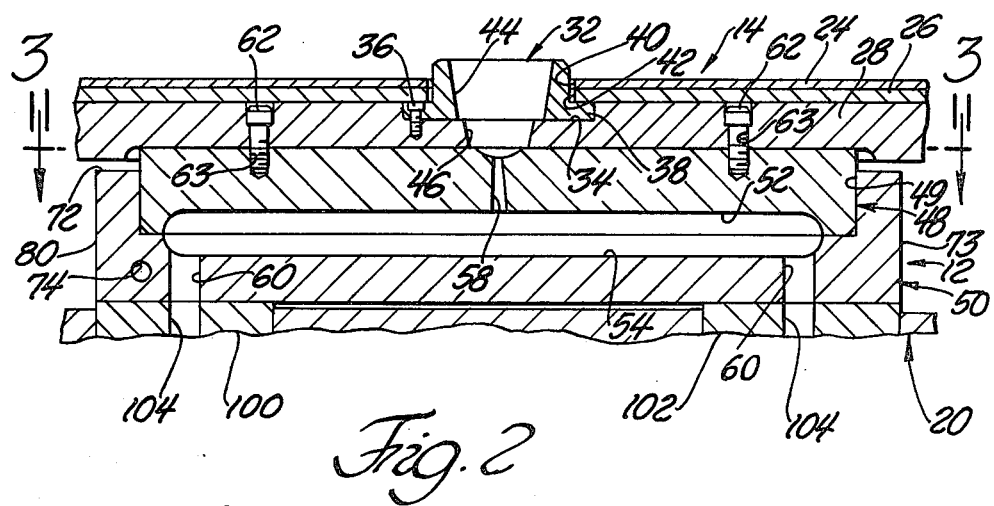
FIG. 2 is an enlarged, sectional view taken along lines 2—2 of FIG. 1.

As shown in FIGS. 1 and 2 the support structure 14 includes an upper support sheet 24 secured to an upper support plate 26 and to an upper support member 28 by bolts 30, only one of which is shown. A collar fitting generally indicated at 32 is secured at a top dished-out surface 36 (only one of which is visible in FIG. 2), which extends through an annular flange portion 38 of the collar fitting 32 and into upper support member 28. The collar fitting 32 extends upwardly from the top surface 32, through concentric holes 40 and 42 formed through the sheet 24 and plate 26, respectively, to receive the thermosetting plastic material in its viscous state within a tapered bore 44 formed therethrough. The bore 44 is aligned and in fluid communication with a tapered opening 46 formed completely through the upper support member.

Figure 3:
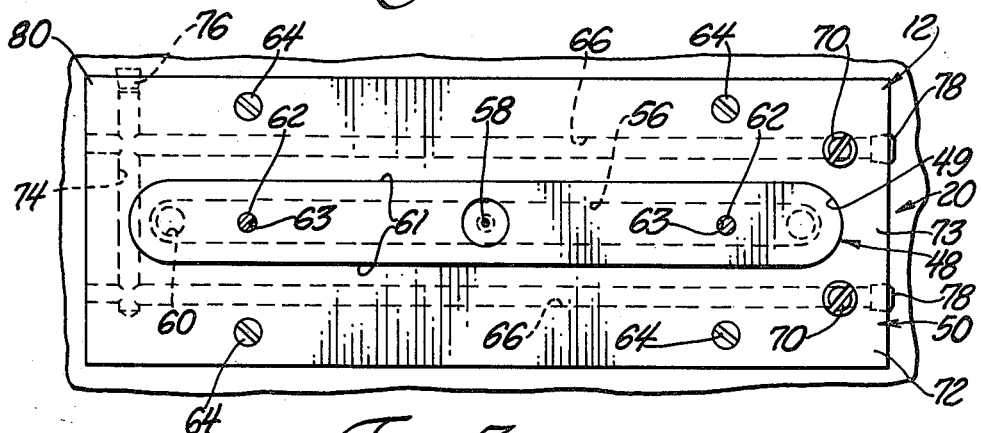
FIG. 3 is a view taken along lines 3—3 of FIG. 2.

In the first embodiment, the manifold 12 comprises an elongated first manifold section 48 disposed within a channel 49 formed in the upper surface of a second manifold section 50. A bottom wall portion 52 of the first manifold section 48 is curved inwardly or concave along the longitudinal length of the first manifold section 48. An upper wall portion 54 of the second manifold section 50 is also curved inwardly along its longitudinal length and forms the complement of the bottom wall portion 52 to define an elongated cylindrical passage 56 which communicates an inlet 58, which is formed through the first manifold section 48 and which is aligned with the opening 46, with a pair of spaced outlet ports 60 which extend from the passage 56 at its opposite ends, completely through the second manifold section 50 and to the nozzle units 16. The side walls 61 of the first manifold section 48 abut the inner side walls of the channel 49 to seal the first manifold section 48 within the second manifold section 50. The first manifold section 48 is secured to the upper support member 28 by a plurality of mounting bolts 62 which extend in threaded holes 63 formed in the first manifold section. The second manifold section 50 is releasably secured to the first mold portion 20 by bolts 64 as shown in FIG. 3.

A second or lower manifold section 50 includes a plurality of interconnected cooling passages including four horizontal passages 66 formed along the longitudinal length of the second manifold section 50. A pair of vertical cooling passages 68 which are closed by plugs 70 at the upper surface 72 of the second manifold section 50, each interconnect two of the horizontal passages 66 at a first end 72 of the second manifold section 50. The lowermost of the passages 66 are interconnected by a laterally extending cooling passage 74 as shown in FIG. 3 and FIG. 2 and is closed by a threaded plug 76. The passages 66 are closed at the first end 73 also by a threaded plug 78.

The uppermost of the passages 66 extend to a second end 80 of the second manifold section 50 and are adapted to be connected to water hoses for circulating the cooling water within all of the passages 66, 68 and 75 to prevent the thermosetting plastic from setting within inlet port 58, the outlet port 60 and the passage 56.

Figure 4:
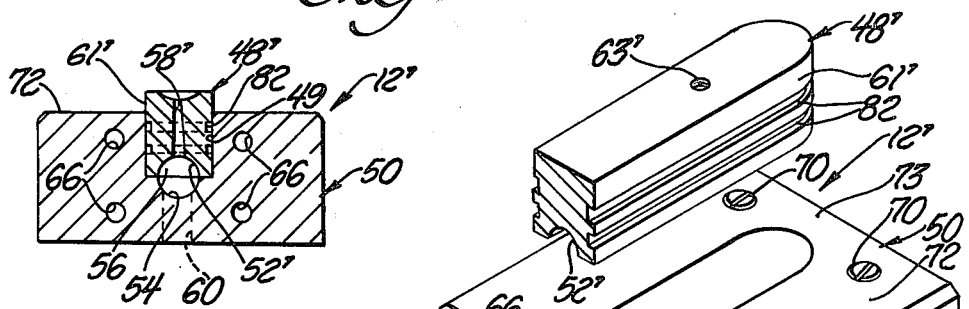
FIG. 4 is a sectional view of a second embodiment of the manifold constructed according to this invention.
Figure 5:
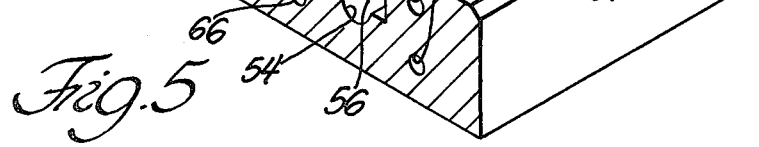
FIG. 5 is an exploded perspective view, shown in section of the manifold of FIG. 4.

FIGS. 4 and 5 illustrate a second embodiment of a fluid distribution member or manifold generally indicated at 12'. As the first embodiment of the manifold 12, the second embodiment of the manifold 12' comprises an elongated first manifold section, indicated at 48', disposed within a second manifold section identical to the second manifold section 50 of the first embodiment and therefore has the same reference numeral. The first manifold section 48' is different than the first manifold section 48 of the first embodiment and therefore prime numbers are used in the description of the first manifold section 48' of the second embodiment.

The first manifold section 48' of the second embodiment is different from the first manifold section 48 of the first embodiment in that the first manifold section 48' of the second embodiment includes a pair of spaced grooves 82 formed in the side walls 61' of the first manifold section 48' about the circumference of the first manifold section 48'. The grooves 82 capture the fluid thermosetting plastic material therein to seal up the first manifold section 48' within the channel 49 of the second manifold section 50.

The apparatus 10 also includes a pair of spacers 84 and 86 separating the upper support member 28 from the upper mold portion 20, the manifold 12 being disposed between the upper support member 28 and the upper mold portion 20 and between the spacer 84 and the spacer 86.

Both of the spacers 84 and 86 are fixedly secured to the upper support member 28 by bolts 88 (only one of which is shown). A bolt 90 extends through a notch 92 formed in a side wall 94 of the upper mold portion 20 and obliquely into the spacer 86 to thereby releasably secure the spacer 86 and, consequently, the upper support member 28 to the first or upper mold portion 20.

The apparatus 10 also includes a locating part or a guide pin 92 which extends through the upper support member 28, through the spacer 84 and into a bore 94 formed in the upper mold portion 20 to thereby locate or position the upper support member 28 and the spacer 84 with respect to the upper mold portion 20. A collar 96 is positioned within the bore 94, the pin 92 extending through the collar 96 in sliding engagement therewith. As is described in greater detail hereinbelow, when the bolt 90 is removed from the spacer 86, the upper mold portion 20 is allowed to move downwardly guided by the guide pin 92 until only the end 98 of the pin 92 is positioned within the bore 94. When this occurs, the first manifold section 28 separates from the second manifold section 50, which is releasably secured to the second mold portion 40 by bolts 64.

The nozzle units 16 include their respective nozzles 100 and 102 each of which has an axial hole 104 extending from and in fluid communication with its corresponding outlet port 60 of the lower manifold section 50. The axial holes 104 extend from the outlet port 60 and through their corresponding mouths 106 (only one of which is shown) of the nozzles 100 and 102 to thereby place the outlet ports 60 in fluid communication with the mold cavity 18. Both of the nozzle units 16 will be described hereinafter with respect to nozzle 102 since the nozzle units 16 are substantially the same in structure.

Figure 6:
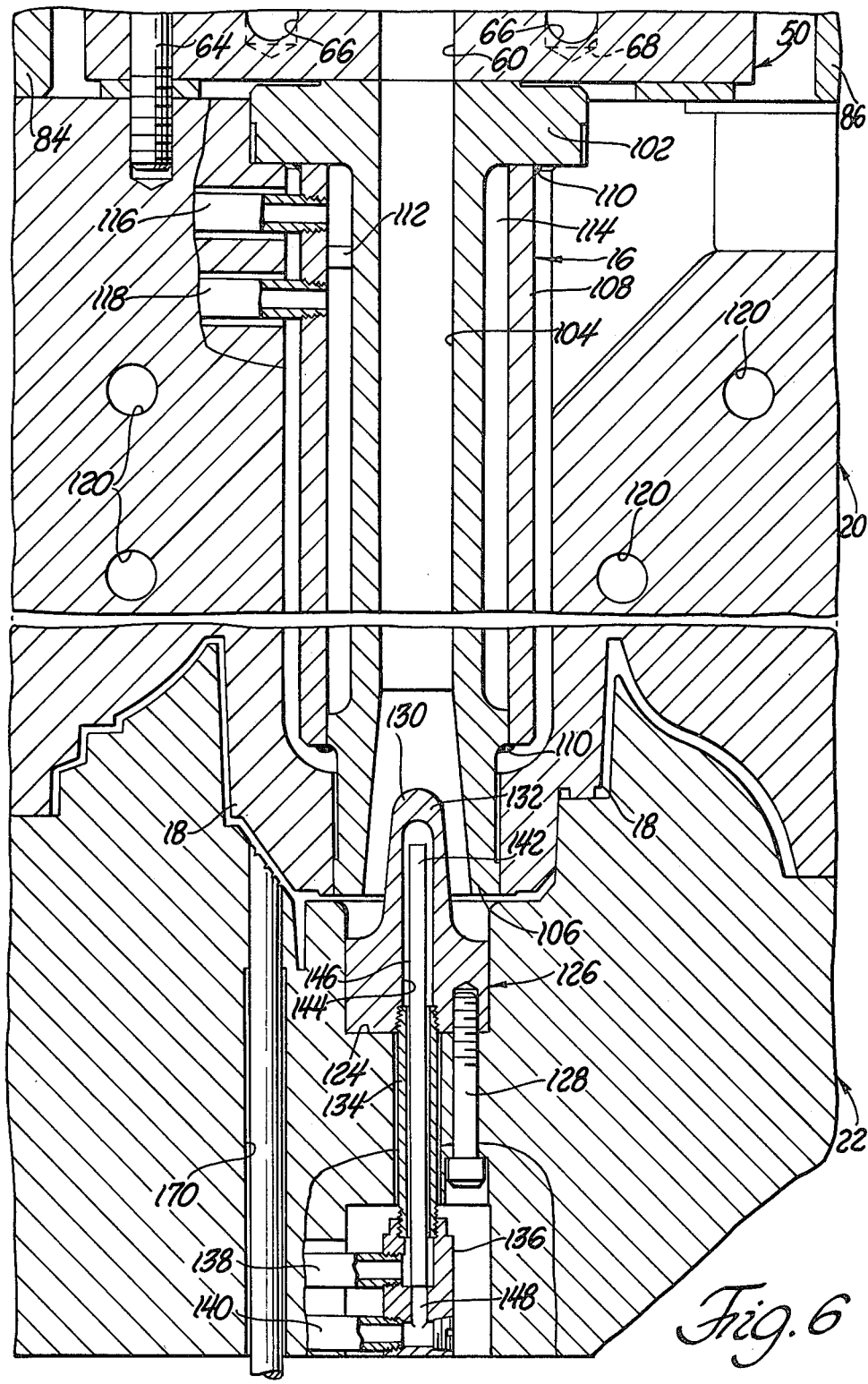
FIG. 6 is an enlarged sectional view of the apparatus of FIG. 1.

Each nozzle unit 16 also includes a sleeve 108 mounted about its respective nozzle such as by welding as shown in FIG. 6 at weld joints 110. Each nozzle unit 16 also includes a plurality of spacer members 112 (only one of which is shown) which are welded to the outer wall of the nozzle 102 circumferentially thereabout and space the sleeve 108 from its nozzle 102. The outer wall of the nozzle 102 together with the inner wall of the sleeve 108 define an annular chamber 114 adapted to receive a circulating cooling fluid such as water by means of tubes 116 and 118 which extend through and are threadedly attached to the sleeve 108 to be in fluid communication with the chamber 114. In this way the nozzle 102 as well as the nozzle 100 are kept cool relative to the upper and lower mold portions 20 and 22, to prevent the thermosetting plastic material from setting in the holes 104 of the nozzles 100 and 102.

The upper mold portion 20 includes a plurality of heating apertures 120 formed therein to convey a heating fluid such as hot water or steam to heat the thermosetting plastic material when the thermosetting plastic material is injected into the mold cavity 18. In the same fashion, the second or lower mold portion 22 is provided with a plurality of heating apertures 122 to also heat the second mold portion 22.

The second mold portion 22 includes a recess 124 formed therein and extending inwardly from its molding surface and aligned with the holes 104 of the nozzles 100 and 102. A spreader unit indicated at 126 is secured within the recess 124 by mounting bolts 128 (only one of which is shown). The spreader unit 126 includes a pair of upwardly extending projections 130 (only one of which is shown) which project upwardly into the mouths 106 of the nozzles 100 and 102 and spread the thermosetting plastic material flowing out of the mouths 106 into different parts of the mold cavity 18.

Each of the projections 130 includes a cooling cavity 132 which receives a cooling fluid to thereby cool the projections 130 to thereby prevent the thermosetting plastic material from setting in the mouths 106 of the nozzles 100 and 102. Elongated sleeves 134 (only one of which is shown) are threadedly attached to the spreading unit 126 aligned with their respective cooling cavity 132. Each of the sleeves 134 is threadedly attached to a junction block 136 to which is also threadedly attached a pair of circulating water tubes 138 and 140. Axially aligned with the sleeve 134 and extending upwardly into the cooling cavity 132 and downwardly adjacent the tube 138 is an inner tube 142, the outer wall of which together with the inner cavity wall 144 and the inner wall of the sleeve 134 define a first circulatory passage 146. Cooling water flows through the tubing 138 in the first circulatory passage 146 and into a second circulatory passage (not shown) defined by the inner wall of the hollow tubing 142. The water flows downwardly in the second circulatory passage within the tube 142, into a bottom portion 148 of the second circulatory passage and out through the tube 140.

The apparatus 10 also includes a lower support sheet 150 and a lower support plate 152 fixedly secured together and to a lower support member 154 by bolts (not shown) in the same fashion that the upper support sheet 24, the upper support plate 26 and the upper support member 28 are secured together. The lower support member 154 is fixedly connected to the lower mold portion 22 by bolts 156 (only one of which is shown). The bolts 156 extend through the lower support member 154, through their respective spacers 158 and into the lower mold portion 22. The lower support member 154 is connected to a hydraulic cylinder to move in a downward direction and thereafter in an upward direction, thereby causing the entire second mold portion 22 to move therewith to thereby enable a set or cured thermosetting plastic sheet part to be removed from the mold cavity 18 between the first and second mold portions 20 and 22, respectively.

A movable slide member, indicated at 160, is slidably mounted on the middle spacer 158 which extends through a hole 161 formed through the slide member 160. The slide member 160 includes a plate section 162 and a block section 164 secured together by bolts 166 (only one of which is shown).

The slide member 160 also includes a pair of elongated cylindrical knockout rods 168 which are secured between the plate section 162 and the block section 164 at one end thereof and which extend through the second mold portion 22 within holes 170 (only one of which is shown).

The slide member 160 is held stationary by a portion of the support structure 14 (not shown) such that when the lower support member 154 moves downwardly as shown in FIG. 1, the slide member 160 moves upwardly along the middle spacer 158 such that the knockout rods 168 engage the undersurface of the molded plastic part to help remove the molded plastic part from the mold cavity 18. If the bolt 90 had previously released the spacer 86 from the first mold portion 20, not only will the second mold portion 22 move downwardly with the lower support member 154, but also the upper mold portion 20 will move downwardly as guided by the guide pin 92 thereby separating the first manifold section 48 from the second manifold section 50.

Both the lower support member 154 and the block section 164 of the slide member 160 are provided with heating apertures 172 and 174, respectively, for the circulation of heating fluid therein and thereby help to maintain the elevated temperature of the second mold portion 22.

When the first manifold section 48 is separated from the second manifold section 50, the nozzle units 16 may then be cleaned by pushing the material which may have set within the holes 104 from the cavity 18 through the outlet ports 60 of the second manifold section 50 and into the cylindrical passage 56.

While the preferred embodiment and other embodiments of the invention have been shown and described herein in detail, those skilled in this art will recognize various alternative designs and embodiments of the present invention as defined by the following claims.

What is claimed is:

1. In an injection molding apparatus for molding parts of thermosetting plastic material: a first mold portion having a molding surface to form one-half of a mold cavity, a second mold portion having a second molding surface to form a second, complementary half of the mold cavity; a fluid distribution member having an inlet port having a restricted opening formed at one surface to receive the plastic material in a viscous state, at least one outlet port formed at another surface thereof and communicating with the mold cavity to release the plastic material in a viscous state and a passage interconnecting the inlet port with the outlet port to conduct the flow of plastic material, said fluid distribution member adapted to be cooled to prevent the fluid plastic material from setting therein, wherein the improvement comprises:

said fluid distribution member including a first distribution section extending along the length of the passage and defining a first wall portion of the passage and a separable second distribution section also extending along the length of the passage and forming the complement of the first wall portion to define the passage, said second distribution section being separable from said first distribution section to permit access to the passage to permit cleaning thereof, and securing means for releasably securing said first and second distribution sections together and wherein said second distribution section has a channel formed at its upper surface and wherein said first distribution section is disposed within said channel, the interconnecting passage being formed by the first and second wall portions within said channel.

2. The apparatus as claimed in claim 1 wherein the side walls of the first distribution section abut the inner walls of the channel to seal the first distribution section within the second distribution section.

3. The apparatus as claimed in claim 2 wherein the side walls of the first distribution section have at least one groove formed thereon to capture viscous plastic material therein, the viscous plastic material setting in the groove to seal the first distribution section within the second distribution section.

4. The apparatus as claimed in claim 1 wherein said first mold portion includes at least two bores extending therethrough, and wherein the apparatus further includes a nozzle unit in each of said bores, and adapted to be cooled and secured within said bore by said second distribution section, each nozzle unit comprising a nozzle having an axial hole extending therethrough and aligned with its respective outlet port to conduct the flow of plastic material from its outlet port to the mold cavity.

5. The apparatus as claimed in claim 4 wherein each of said nozzle units includes a sleeve axially mounted about its respective nozzle to define an annular chamber between the inner wall of the sleeve and the outer wall of the nozzle and having inlet and outlet orifices to receive a circulating cooling fluid therein to cool the nozzle relative to the first and second mold portions to prevent the plastic material from setting in the hold of the nozzle.

6. The apparatus as claimed in claim 4 or claim 5 wherein each of said nozzles has a mouth located adjacent the mold cavity, the hole extending through the mouth, and wherein said second mold portion has a recess extending inwardly from said second molding surface and aligned with the axial hole of the nozzle and wherein said apparatus further includes a spreading device secured within said recess and having a projection extending into each of the mouths of the nozzles to spread the plastic material flowing out of the mouths into different parts of the mold cavity.

7. The apparatus as claimed in claim 6 wherein said spreading device includes a cooling cavity formed therein to receive a cooling fluid to cool the spreading device to thereby prevent fluid plastic material from setting in the mouths of the nozzles.

8. The apparatus as claimed in claim 7 including a sleeve secured to said spreading device and a tube disposed within said sleeve and extending into said cavity; the cavity wall, the inner wall of the sleeve and the outer wall of the tube defining a first circulatory passage and the inner wall of the tube defining a second circulatory passage, the cooling fluid circulating through the first and second circulatory passages to cool the spreading device.

9. The apparatus as claimed in claim 4 including a support structure including an upper support member secured to said first distribution section and wherein said upper support member is movable relative to said second distribution section to allow access to the interior of the interconnecting passage and to allow access to said second distribution section, said second distribution section being secured to said first mold portion to prevent the removal of said nozzle unit from said bores.

10. The apparatus as claimed in claim 9 including a pair of spaced apart spacers, each of said spacers being secured to said upper support member and at least one of said spacers being releasably secured to said first mold portion by said securing means for spacing the upper support member from said first mold portion, said distribution member being disposed between said spacers and between said first mold portion and said upper support member.

11. The apparatus as claimed in claim 9 wherein said upper support member has an opening extending completely therethrough and a collar secured therein in alignment with said inlet port for conducting the plastic material into the inlet port.

12. The apparatus as claimed in claim 9 including insulating spacer members for insulating the second distribution section from the first mold section.

13. The apparatus as claimed in claim 12 including a locating part extending into said upper support member, through one of said spacers and into said first mold portion to locate the upper support member relative to said first mold portion.

* * * * *